UNITED STATES PATENT OFFICE.

JOHN H. STEVENS, OF NEWARK, NEW JERSEY, ASSIGNOR TO THE CELLULOID COMPANY, OF NEW YORK, N. Y., A CORPORATION OF NEW JERSEY.

TRANSPARENT PYROXYLIN PLASTIC COMPOSITION.

SPECIFICATION forming part of Letters Patent No. 622,294, dated April 4, 1899.

Application filed January 14, 1899. Serial No. 702,125. (No specimens.)

*To all whom it may concern:*

Be it known that I, JOHN H. STEVENS, of the city of Newark, county of Essex, and State of New Jersey, have invented certain new and useful Improvements in Transparent Pyroxylin Plastic Compositions, of which improvements the following is a specification.

Pyroxylin or nitrocellulose is formed by subjecting cotton, paper, or other cellulose fiber to the action of a mixture of nitric and sulfuric acids. It is a substance which represents many varieties or kinds, dependent on the degree of activity or other peculiarities of the reaction between the cellulose and nitrous elements of the acid-bath. The classification of pyroxylin has been based on the amount of nitrogen or nitrous elements present, especially for explosives, but also and chiefly on the solubility of the different kinds in various menstrua, because pyroxylin containing the same percentage of nitrogen often varies in solubility. The former classification is useful for many purposes, but chiefly in connection with certain solid nitrocellulose products used in gunnery, because the intensity of discharge depends largely on the amount of nitrogen gas liberated on explosion, regardless of solubility; but for manufacturing purposes the solubility and strength of the pyroxylin is all important and the physical classification is kept in view, because the same percentage of nitrogen often gives different solubilities.

Pyroxylin is compounded with solvents and other substances to form a great variety of products. These products present wide differences, dependent on their nature and application; but they can be divided into, first, explosives for blasting and gunnery; second, collodions or flowable solutions; third, solids such as are used in imitation of natural substances. Each of these classes contains subclasses. For instance, class three is further subdivided into transparents and non-transparents. While all of these products are made from pyroxylin and often with somewhat similar ingredients, they must necessarily possess certain definite properties which will fit them for specific applications. Consequently a pyroxylin compound is not distinguished by the names of its ingredients, but by their character, proportions, and structural association. Thus pyroxylin and nitroglycerin will form a mass resembling wet sawdust, a syrupy fluid, or a homogeneous rubber-like mass by simply varying the kinds of pyroxylin, some pyroxylin being insoluble in nitroglycerin, some easily soluble, and some simply swelling up to a jelly in its presence. Similarly, in making compositions for rolling, a mixture of camphor, alcohol, and pyroxylin will make a pulverulent mass, an opaque solid, or a transparent compound by simply varying the quality or quantity of the ingredients.

The compositions which form the subject of the present invention belong to the subclass of transparent moldable pyroxylin compounds, and they are intended principally for use in the arts as imitations of amber, glass, and tortoise-shell. I have found by a long experience that the essential characteristics for such imitations are solidity, transparency, plasticity under heat, or capability of being pressed into different shapes in hot dies or otherwise when in a hard condition, and permanency or resistance to the action of time or elevated temperatures.

While the different ingredients from which I form my compositions are well known and some of them have been suggested to be used in connection with a certain kind of pyroxylin known as "tetranitrocellulose," they have not, so far as I am aware, been brought into the peculiar new relations which I have demonstrated form a composition possessing entirely new properties of great value in this art. The property of permanency in these transparent compounds is of extraordinary importance, because it is closely associated with the danger of destructive fires and deterioration of valuable goods.

Pyroxylin and its compounds are more or less liable to a decomposition which results in the generation of free acid. This generally occurs when these products are stored or kept for any length of time, especially in large masses, where the heat of decomposition might accumulate through lack of surface exposure. The presence of solvents or the dissolved condition hinders this tendency to disorganization; but if even the most carefully prepared products contain no preservative substance there is always danger of the evolution of acid, the effects of which are disadvantageous and often hazardous.

There are plenty of known means for securing stability in non-transparents or even in clouded transparents; but the arts demand a high transparency in order to successfully imitate amber and glass effects, and it has been extremely difficult to secure high transparency and stability at the same time. Hence any composition of matter which gives the desired properties has to depend on proportions, the properties of the substances, and their behavior under special conditions of manufacture, such as their reaction or compatibility with other necessary ingredients of the transparent compounds. For these reasons many antacids have been tried and thrown aside, and those which the art now possesses have been selected from a larger number, which might have been expected to yield good results, but which failed because they did not meet the requirements. Some substances, while efficient as neutralizers of acid, would in turn injure the nitrocellulose by aiding or inviting decomposition. Some cause discoloration and most of them are incompatible with transparency. Urea and urea acetate, for instance, when in contact with pyroxylin yield nitro products which attack metals and cause an exudation or efflorescence which is detrimental, especially on polished surfaces of pyroxylin compounds. The corrosive nature of these by-products renders extraordinary care necessary when using fine metal dies or plates. Urea and urea acetate are more or less subject to discoloration, especially under severe conditions of treatment where heat is applied to the products or when they are exposed to a strong light.

It frequently happens, as I have already pointed out in my United States Patent No. 519,987, that the mere employment of a substance in connection with pyroxylin for one purpose does not necessarily disclose its usefulness for other purposes or the peculiar properties which it may give the compound under other conditions of treatment or its use in other proportions or in different combinations. This is illustrated in the history of the art, and it is because of the many applications of these compounds and the peculiar properties demanded for their many uses that inventors have given them so much attention. Many hundreds of patents have been issued, both in this country and abroad, for various processes, mixtures, and applications. First, the pyroxylin itself, of different kinds, has been made by numerous methods and subjected to various treatments; second, the compounds have been made by many special processes; third, liquid solvents in great variety have been discovered and applied; fourth, solid solvents, or solvents which when melted by heat or dissolved in a liquid act on the pyroxylin, have been discovered and used; fifth, various non-solvent substances have been employed to modify the character of the compounds and render them susceptible of special application; sixth, the art has been advanced by special combinations or the association of old ingredients with new processes; seventh, the applicability of special compounds to particular uses has formed the basis for numerous inventions, and, eighth, certain compounds have depended for their properties not only on special ingredients but also on the particular kind of pyroxylin used.

The present invention is based on the discovery of new properties in certain solid bodies which are neither alone nor in solution solvents of the pyroxylin generally employed for manufacturing transparent compounds. It includes their action with other ingredients and the necessary proportions to be used to effect useful results, and its place in this field is best understood by referring to the history of a somewhat similar line of invention. Thus by some inventors certain inorganic salts have been proposed to be used to render pyroxylin compounds non-inflammable. Examples of such salts, for instance, are chlorid of calcium, chlorid of zinc, &c.; but in order to effect such result they must necessarily be used in large proportions to the amount of pyroxylin present. So, also, some other salts—such as oxalate of ammonium, chlorate of potash, and nitrate of soda—have been added by some inventors to the explosive varieties of nitrocellulose in order to modify or increase the explosive power. Still again, certain salts have been proposed to be used when added to non-solvents of pyroxylin, like ethyl alcohol, in order to make the mixture a solvent of a certain kind of pyroxylin known as "tetranitrocellulose;" but none of these uses is in any way analogous to my invention, which relates solely to the discovery that certain salts, when added to transparent pyroxylin compounds in certain proportions, have the effect of neutralizing the nitrous acid developed in such compounds, and thereby tend to preserve these compounds from deterioration, at the same time that they do not interfere with the transparency of the compound, which is so desirable for many purposes. That the discovery of the utility of the salts mentioned in this application for this purpose is foreign to the various inventions of prior inventors, recited above, is shown by the fact that many of the inorganic salts and equivalent substances mentioned by them as useful for the several purposes above referred to are wholly unsuited to the purpose of my invention.

The salts that I refer to and which are included within my invention are known as the "zinc" salts of the volatile monatomic fatty acids. The principal acids of this group are formic, acetic, propionic, butyric, and valeric acids. The salts resulting from the chemical combination of these acids with zinc are zinc formate, zinc acetate, zinc propionate, zinc butyrate, and zinc valerate. These are the salts which form one part of my new transparent compositions of matter consisting, essentially, of pyroxylin, camphor, a liquid solvent, and an antacid or preserving substance, and of these preserving-salts I prefer zinc acetate. I have used these salts successfully and have determined by experiment their relative value for the purpose. While they all possess more or less antacid power, I prefer to use the salts which are most easily soluble, especially in alcohol or wood-spirit, because these are the solvents most commonly used in the art. By "soluble" of course I mean (as is usually meant by the term) in the cold. While an ordinary mechanical mixture of the preserving agent with the pyroxylin compounds is sufficient to impart stability, the employment of a solution of the salt permits a better distribution, so that every part of the pyroxylin or its compounds is protected by reason of intimate contact with the salt.

In making my new compositions I mix ordinary soluble pyroxylin, such as is used for manufacturing purposes, with a liquid solvent and enough camphor to give the final product molding properties. The liquid solvent is preferably wood-spirit and is used in sufficient proportion to produce a mass which can be masticated in the rolls or mixing machinery, although I do not confine myself to any particular proportion so long as the final result is a solid transparent compound. I introduce the antacid salt preferably in solution in wood-spirit, although it can be introduced in the form of powder, in which case the mastication with the solvent and other ingredients results in a thorough incorporation of the salt. The well-known menstruum acetate of methyl can be used in place of wood-spirit, if desired, or, in fact, any good solvent which will dissolve the antacid salt or permit it to become incorporated with the pyroxylin. As to proportions I find that one per cent., by weight, of the salt to the pyroxylin is sufficient for good results, while in no case should more than five per cent. be used. I have discovered in operating with these salts that those which dissolve most readily in the solvent used to form the compounds are the most powerful in their preserving effects. The formate of zinc is more feeble in antacid power than the acetate, has a greater tendency to evolve gases, especially under heat, is less easily soluble, and gives only a moderate transparency. All the other zinc salts mentioned give good transparency.

I would recommend that the formate of zinc be confined to products in which high transparency is not especially desired and which are not to be subjected to severe conditions of treatment in their manufacture, and in which also gaseous products and bubbles are unobjectionable. Nevertheless it is a fair antacid.

The propionate, butyrate, and valerate of zinc are also powerful antacids. The butyrate and valerate have a more or less offensive odor, which is absent in the other salts. All of these salts with the exception of the formate seem to be, proportion for proportion, superior to urea as preservers. While products made with them are more inclined to yellowness than urea-pyroxylin compounds, they possess the elements of efficiency and cheapness. Cheapness is quite a consideration, especially in the manufacture of compounds whose extensive use depends largely on low cost. The yellowness imparted by zinc acetate, however, is of so moderate a degree that it does not prevent its application to all the purposes for which these compounds are used. I have employed zinc acetate with considerable success in forming pyroxylin sheets of high transparency and also for an excellent imitation of amber, both clear and mottled. It is especially useful in stained-glass effects.

The zinc salts possess other advantages over some of the antacids heretofore used. For instance, pyroxylin compounds made with urea are sometimes contaminated by a product resulting from the reaction between the urea and the nitro element present. This product is presumably nitrate of urea. At any rate compounds made with urea when subjected to severe treatment, like heat in connection with metal plates, are liable to a smearing of the surface of the sheets and a staining or smutching of the polishing-plates or metal dies. Urea-pyroxylin compounds are also apt to blister easily under heat and change color. In using these salts of zinc, especially the preferred ones, like zinc acetate, these defects seldom occur, and imitation tortoise-shell sheets, for instance, made with zinc acetate as the preserving agent, present a better surface and the polishing-plates last longer than is the case with urea compounds. The zinc-acetate mixtures also remain homogeneous under heat and the colors are more stable than those in the urea compounds.

While I confine myself to the proportions and ingredients necessary to produce solid transparent compositions, I may state that a good example of proportions is, by weight, one hundred parts of soluble pyroxylin, forty to fifty parts of camphor, fifty to seventy-five parts of wood-spirit, and one part of zinc acetate. I have discovered that solvents in which the zinc acetate is insoluble can be used with the compound, provided the antacid salt is first dissolved in wood-spirit. I have also discovered that though camphor does not unite with these zinc salts in simple admixture it is entirely compatible with them and pyroxylin when used as described and forms a homogeneous compound. There is no separation nor consequent cloudiness which would be fatal to the effects desired. I confine myself to such proportions of these new antacid salts as are within their limits of usefulness for my transparent compounds. Of the formate I would not recommend the use of more than one per cent. to the pyroxylin, because even at two per cent. the compounds lack high transparency and blister easily when pressed under heat in a dry condition. The acetate at three per cent. begins to lose its glass-like appearance and at more than five per cent. exceeds its limit of usefulness for transparent effects and makes another compound entirely. The propionate, butyrate, and valerate are also more or less objectionable in proportions above five per cent., so that it can safely be said, and especially of the acetate, that proportions above five per cent. give no indication of its usefulness when used as I have specified. I find, therefore, that practically about one per cent. is a good proportion, especially as it gives better transparency and less discoloration than higher proportions, though for many purposes even less can be used, but with a corresponding decrease in stability.

While I am unable to explain why a basic substance already saturated with an acid can act as a preserving agent and prevent the deleterious action of the corrosive nitro compounds in decomposing pyroxylin, my experiments have nevertheless demonstrated this to be a fact. I can only state that it seems to depend on the nature of the acid radical present in the preserving agent. Even when the elements contained in these preserving-salts are united to other substances—for instance, in neutral salts containing dissimilar acid radicals—the resultant compound salt possesses preserving power at least in proportion approximating to the amount of such element present. As an instance of the effect of the nature of the acid radical present in these preserving-salts I can state that I have found by experiment that while zinc acetate is a good antacid substance in connection with pyroxylin, sulfite of zinc and chlorid of zinc are totally unsuitable as ingredients in my compounds. Perfect solubility of the salt in the solvent employed and the ability to form highly-transparent effects do not give the salt antacid power, for I have found that chlorid of zinc dissolves in wood-spirit and grain-alcohol and forms a close highly-transparent combination with the pyroxylin compounds, while at the same time it is useless for moldable transparents, as compounds containing it even in one-per-cent. proportion become dull and clouded when heated under pressure. They also smudge and otherwise injure the polishing-plates. In fact, hygroscopic substances, as some of the chlorids—for instance, the chlorids of calcium and zinc—while they may be capable, in connection with alcohol and a special pyroxylin, of making a pyroxylin compound useful for artificial silk, filaments for lamps, and a certain class of varnishes, are totally incapable of forming a useful imitation of amber, tortoise-shell, or glass having the requisite surface effects and chemical stability. I have long known by experience that chlorid-of-calcium compounds attract moisture and become wet on the surface, which property would prevent the sale of such articles as tortoise-shell combs, amber pipe-bits, or transparent sheets for decorative purposes, for all of which my invention is specially applicable.

While the solution of chlorid of calcium on the surface can be washed away to some extent, it is always liable to exude from the body of the material and form fresh deposits. Such materials are either incapable of polish or will not retain their polish by reason of this exudation.

By "solid transparent pyroxylin" compositions I mean those which permit the transmission of light—for instance, sheets, rods, or articles made in imitation of amber, glass, tortoise-shell, and horn.

I am aware that zinc acetate has been described as making ethyl alcohol a solvent of the special collodion pyroxylin known as "tetranitrocellulose" and as a substitute and equivalent for this purpose of calcium chlorid and other chlorids of the metals and alkaline earths as well as oxalic, citric, and carbolic acids, and other substances absolutely useless as antacids. The proportion, however, in such use must be such as will enable it to dissolve the tetranitrocellulose, such proportion being at least five per cent. to the amount of alcohol used, and the alcoholic solvent to be employed unmixed with and as a substitute for other solvents and in sufficient quantity to dissolve the tetranitrocellulose. There has been suggested as an economical proportion three parts, by weight, of alcohol to one part of tetranitrocellulose.

Acetate of zinc will not aid alcohol (either ethylic or methylic) in dissolving the kind of pyroxylin I use for my compositions; but my experiments have positively demonstrated that it retards or weakens the solvent power directly as to the amount present in the alcohols. For instance, a five-per-cent. solution in ninety-five-per-cent. ethylic alcohol will not dissolve the pyroxylin even when the alcohol is in large excess and at the end of two days' contact at ordinary atmospheric temperatures. By using a methylic alcohol so weak with water that it barely dissolves pyroxylin I find that a saturated solution of zinc acetate in this weak alcohol is an absolute non-solvent. By using the more soluble sodium acetate, said to be an equivalent of the zinc salt in dissolving tetranitrocellulose, I obtained a solution still stronger in salt. The ninety-five-per-cent. alcohol saturated with sodium acetate did not dissolve ordinary pyroxylin, and a saturated solution of sodium acetate in the strongest commercial wood-spirit was a non-solvent in the cold, although the spirit was a powerful and rapid solvent without the acetate. Hence any use of zinc acetate in alcoholic solution, when using the ordinary pyroxylin employed for commercial pyroxylin compounds, including even that employed for varnishes, lacquers, and waterproofing, would fail to suggest either solvent power or its vastly more important value in transparents. Besides this my experiments have demonstrated that all proportions in which the zinc acetate has been recommended to be used would fail to give a final transparent composition of matter. I am not aware, therefore, that acetate of zinc has ever been used in making a moldable or plastic imitation of glass, horn, amber, and tortoise-shell, or that it has been suggested in such proportions as would form such a composition, or that any one before my experiments and reduction to practice of this invention has known or described the valuable preserving property of zinc acetate in my compounds or has even suggested its utility with camphor.

While I have found that zinc acetate and the rest of my new group are applicable as antacids for purposes outside of the transparent pyroxylin compounds of the present invention—for instance, smokeless powders and lacquers—nevertheless, as there are other suitable antacid substances useful for nontransparent compounds, and because of the extraordinary utility of these new antacid substances in solid transparent moldable compounds, I have confined my claims to this class of compounds.

Wherever I have mentioned "camphor," it is to be understood that I can employ any equivalent solid solvent which will give the compound the molding property or the property of plasticity under heat, as is well understood. Many such substances are known. I do not therefore claim the broad use of these new antacid substances with pyroxylin in all proportions; but any use of my proportions of zinc acetate or the rest of the group in a solid transparent compound of pyroxylin such as described by me is a practice of my invention, whether the compound is made as I have described or by adding to an ordinary transparent pyroxylin-camphor compound sufficient alcohol and zinc acetate to give my proportions and results.

For the reasons above described I include in my invention the present group of zinc salts of the volatile monatomic fatty acids as preserving agents for transparent pyroxylin compounds, whether the salts are simple, compound, mixed, or combined chemically with other salts or compounds; but I exclude any combination of the salts of this specification with the halogen acids, for such compounds have already been patented by me in United States Patent No. 614,514, of November 22, 1898, which patent included such substances, for instance, as chlorformate of zinc, chloracetate of zinc, chlorpropionate of zinc, &c.

Having thus fully described my invention, what I claim, and desire to secure by Letters Patent, is—

1. A solid transparent composition of matter consisting of camphor, a preserving zinc salt of a volatile monatomic fatty acid, and pyroxylin which is insoluble in a cold saturated solution of zinc acetate in ninety-five-per-cent. ethyl alcohol, the said salt being present in the composition in proportion not exceeding five per cent. to the pyroxylin, substantially as described.

2. A solid transparent composition of matter consisting of pyroxylin, camphor, and a preserving zinc salt of a volatile monatomic fatty acid, the acid, the said salt being present in the composition in proportion not exceeding five per cent. to the pyroxylin, substantially as described.

3. A solid transparent composition of matter containing camphor, zinc acetate and pyroxylin which is insoluble in a cold saturated solution of zinc acetate in ninety-five-per-cent. ethyl alcohol, the said salt being present in the composition in proportion not exceeding five per cent. to the pyroxylin, substantially as described.

JOHN H. STEVENS.

Witnesses:
WALTER P. LINDSLEY,
M. R. EISELE.

It is hereby certified that in Letters Patent No. 622,294, granted April 4, 1899, upon the application of John H. Stevens, of Newark, New Jersey for an improvement in "Transparent Pyroxylin Plastic Compositions," an error appears in the printed specification requiring correction, as follows: In line 79, page 5, the words "the acid" should be stricken out; and that the said Letters Patent should be read with this correction therein that the same may conform to the record of the case in the Patent Office.

Signed, countersigned, and sealed this 11th day of April, A. D., 1899.

[SEAL.]

WEBSTER DAVIS,
*Assistant Secretary of the Interior.*

Countersigned:
    C. H. DUELL,
        *Commissioner of Patents.*